United States Patent [19]
Mayr et al.

[11] 4,113,654
[45] Sep. 12, 1978

[54] CATALYSTS FOR THE POLYMERIZATION OF OLEFINS

[75] Inventors: Adolfo Mayr, Ferrara; Velmore Davoli, Reggio Emilia; Antonio Leccese; Ermanno Susa, both of Ferrara, all of Italy

[73] Assignee: Montecatini Edison S.p.A., Milan, Italy

[21] Appl. No.: 733,709

[22] Filed: Oct. 18, 1976

Related U.S. Application Data

[63] Continuation of Ser. No. 505,901, Sep. 13, 1974, abandoned, which is a continuation of Ser. No. 245,665, Apr. 19, 1972, abandoned.

[30] Foreign Application Priority Data

Apr. 20, 1971 [IT] Italy .............................. 23399 A/71

[51] Int. Cl.$^2$ .............................................. C08F 4/64
[52] U.S. Cl. .......................... 252/429 C; 252/431 R; 252/431 N; 526/125; 526/151
[58] Field of Search ....................... 252/429 C, 431 R

[56] References Cited

U.S. PATENT DOCUMENTS

| 3,130,003 | 4/1964 | Tornqvist et al. ........... 252/429 C X |
| 3,150,107 | 9/1964 | Hoeg et al. .................. 252/429 C X |
| 3,392,159 | 7/1968 | Schooley et al. ................ 252/431 R |

*Primary Examiner*—Patrick P. Garvin

[57] ABSTRACT

There are disclosed catalysts which are highly active in the polymerization of olefins and which are prepared by mixing hydrides or organometallic compounds of metals belonging to Groups I to III of the Mendelyeev Periodic Table with the product of reaction between an organic magnesium halide and a halogenated titanium compound, said reaction product containing titanium in an amount of from 0.05% to 10% by weight. Methods for preparing the aforesaid catalysts and the use of the catalysts in the polymerization of ethylene and mixtures thereof with higher alpha-olefins and/or diolefins are also disclosed.

3 Claims, No Drawings

CATALYSTS FOR THE POLYMERIZATION OF OLEFINS

This application is a continuation of application Ser. No. 505,901, filed Sept. 13, 1974, now abandoned, and which was a Rule 60 continuation of Ser. No. 245,665, filed Apr. 19, 1972, also now abandoned.

THE PRIOR ART

The polymerization of ethylene with the aid of catalysts of various types has been disclosed. One of the best known catalysts used in the prior art processes consists of the product obtained by mixing an organometallic compound of a metal belonging to Groups I, II or III of the Mendelyeev Periodic Table with a titanium compound.

Organometallic compounds of aluminum have been used most commonly in preparing the mentioned prior art catalysts. However, organic magnesium compounds have also been proposed for such use. Thus, for instance, British Pat. No. 1,030,770 describes a catalyst for the polymerization of olefins obtained by reacting an organo-magnesium complex, preferably an aromatic organo-magnesium complex, with a compound of titanium, vanadium, cobalt or zirconium. The preferred molar ratio between the magnesium complex and the titanium compound is about 1.0. According to the British patent the catalyst must be aged for a certain period of time to increase its activity, before it is used in the polymerization of the olefins. Alternatively, and for the same purpose, the organo-magnesium complex may be used in combination with an organic-aluminum compound. In any case, the activity of the catalyst is relatively low and the polymer obtained with the aid thereof must be freed of residues of the catalyst by known methods before the polymer can be used.

THE PRESENT INVENTION

An object of this invention was to provide catalysts one component of which is an organo-magnesium halide but which are very highly active in the polymerization of olefins and particularly of ethylene and mixtures of ethylene with higher alpha-olefins to polymerizates which can be used directly without purifying after-treatments for the removal of catalyst residues.

This and other objects are accomplished by the present invention, in accordance with which the highly active catalysts are prepared by mixing (A) a hydride or organometallic compound of the Groups I to III metals with (B) the product obtained by reacting an organic magnesium halide with a halogenated titanium compound under conditions such as to result in a reaction product containing from 0.05 to 10% by weight of titanium.

The organic magnesium halides useful for obtaining the catalysts of this invention have the general formula RMgX, in which R is an alkyl, aryl, aralkyl or alkyl-aryl radical and X is an halogen atom, preferably a chlorine atom. Such magnesium compounds may be prepared by the known methods of preparing Grignard reactants in hydrocarbon solvents.

Specific examples of organic magnesium halides useful for the preparation of the present catalysts include: ethyl-, propyl-, and butyl magnesium chlorides, bromides and iodides, phenyl-magnesium chlorides, bromides and iodides; naphthyl-magnesium chloride; p-toluene-magnesium chloride; and 2,4,6-trimethylbenzene-magnesium chloride.

Particularly satisfactory results are achieved by using alkyl magnesium halides obtained by the reaction of hydrocarbon halides with magnesium metal in hydrocarbon solvents. For instance, useful alkyl magnesium halides may be prepared by reacting n-butyl chloride with magnesium in n-heptane or tetrahydronaphthalene, preferably in the presence of iodine.

Halogenated titanium compounds useful for preparing the present catalysts are, for instance, the halides, oxyhalides, haloalcoholates, halotitanates, titanates of ammonium or alkyl-ammonium or of alkaline metals, and titanium halo-amides. Other useful titanium compounds are those obtainable from the aforementioned Ti compounds and from alcoholates and amides of alkaline metals, such as, for instance, $LiTi(OC_3H_7)_2Cl_3$ and $LiTi(C_{12}H_8N)_4$ in which $(C_{12}H_8N)$ represents a carbazyl radical; $CH_3TiCl_3$; $C_2H_5TiCl_3$; $C_2H_5TiCl_2$; and $CH_3TiBr_3$.

Particularly good results are obtained by starting with $TiCl_4$ and $TiCl_3$.

The relative quantities of titanium compound and organic magnesium halide which are reacted to obtain component (B) of the catalyst can vary within a very wide range provided that the amount of Ti in the reaction product is comprised between 0.05 and 10% by weight. Particularly good results, in terms of polymer yield per gram of Ti used, are obtained when component (B) of the catalyst — that is, the product of reaction between the Ti compound and the organic magnesium halide-contains from 0.1 to 5% by weight of titanium. The molar ratio of magnesium compound to titanium compound most conveniently used is comprised between 2.5 and 1,000, and preferably between 5 and 300.

In a presently preferred embodiment of the invention, when the halogenated titanium compound is liquid the reaction between it and the organic magnesium halide is effected by adding the Ti compound to a suspension of the organic magnesium halide in a hydrocarbon solvent, at a temperature which can vary over a wide range but is preferably between 20° C and 80° C. Instead of using a hydrocarbon solvent as diluent, an excess of the liquid Ti compound can be used. The reaction product can be separated from the reaction suspension by filtering, or the suspension can be used as such in preparing the final catalyst.

When solid Ti compounds are used in preparing component (B), they are co-ground with the organic magnesium halide, for instance in a ball mill, preferably in the absence of a diluent.

All hydrides and organometallic compounds of the metals belonging to Groups I, II or III and which are known to be activators of the transition metal compounds used in preparing conventional so-called "Ziegler-Natta catalysts" can be used as component (A) of the catalysts according to this invention. Preferred hydrides and organometallic compounds are, e.g., $Al(C_2H_5)_3$, $Al(C_2H_5)_2Cl$, $Al(iC_4H_9)_3$, $Al(iC_4H_9)_2Cl$, $Al(C_2H_5)_2H$, $Al(iC_4H_9)_2H$, $Al(C_2H_5)_2Br$, $LiAl(iC_4H_9)_4$, $Li(iC_4H_9)$, $Mg(C_2H_5)_2$.

The molar ratio between component (A) and component (B) is not critical. For catalysts to be used in the polymerization of ethylene, the Al/Ti molar ratio is preferably comprised between 100 and 1000.

The catalysts of this invention are used in the polymerization and copolymerization of olefins according to known methods, that is, in the liquid phase in the presence or absence of an inert solvent, or in the gaseous phase.

The catalysts may be performed by mixing component (A) with component (B) and then loading the mixture into the polymerization reactor, or the two components may be fed into the reactor separately.

The polymerization or copolymerization temperature is comprised between −80° C and 200° C, but preferably is from 50° C to 100° C, under atmospheric or increased pressure.

The molecular weight of the polymer formed can be regulated during the polymerization reaction by the known methods, for instance by operating in the presence of alkyl halides, organometallic compounds of zinc or cadmium, hydrogen or other chain-transfer agents.

The catalysts are not only so highly active that the polymer obtained can be used directly without requiring special purification treatments for the removal of catalyst residues, but these catalysts remain highly active even in the presence of hydrogen and other chain-transfer agents known to have a regulating effect on the molecular weight of the polymer produced in the presence thereof.

For instance, in the case of polyethylene produced in contact with the catalysts of this invention it is possible to regulate the molecular weight to a value corresponding to an intrinsic viscosity, in tetralin at 135° C, comprised between 1 and 3 dl/g, and still obtain the polyethylene in such a high yield per gram of Ti used that purification of the polyethylene prior to use is not required.

The polyethylene obtained with the aid of the present catalysts is a substantially linear, highly crystalline polymer having a density of 0.96 g/cc or higher, and which has excellent workability characteristics. The workability is generally better than that of polyethylene obtained with the aid of the known co-called "Ziegler catalysts".

The present catalysts are not only useful in the homo-polymerization of ethylene and the copolymerization of ethylene with higher alpha-olefins and/or diolefins, but are also in the homo-polymerization of other olefinic monomers polymerizable by "Ziegler catalysts", and including propylene.

The following examples are given to illustrate the invention and are not intended to be limiting.

EXAMPLE 1

10 g of dry magnesium powder and 36 cc of n-butyl chloride were contacted with each other in a four-necked 1-liter flask fitted with a stirrer, a cooler, a thermometer and a feeding funnel, in 200 cc of n-heptane and in the presence of 0.8 g of iodine.

The whole was then reflux-heated for about 3 hours with an electrically thermostated bath.

The unreacted metallic magnesium was separated from the suspension, to which was added 4 g of titanium tetrachloride in 10 cc of n-heptane, at a temperature of about 50° C.

The $TiCl_4$ solution was added dropwise to the suspension of n-$C_4H_9MgCl$ over a period of about 5 minutes. The reduction was then completed by heating the mixture at 50° C for about 1 hour. The suspension was finally filtered on a porous plate; the solid was repeatedly washed with n-heptane and then dried under vacuum. The dry product contained 3.52% of titanium by weight.

0.11 g of the product (component B) thus prepared was introduced, together with 1,000 cc of n-heptane and 2 g of aluminum triisobutyl, in a nitrogen atmosphere, into a stainless steel autoclave of 1.5 lt holding capacity, fitted with a comb-stirrer (400 rpm) and heated at a temperature of 85° C.

To the reactor were then added ethylene (10 atm) and hydrogen (3 atm) and the pressure was maintained constant throughout the test, by the continuous addition of ethylene. After 4 hours, the polymerization was interrupted, the suspension was discharged from the autoclave, and the polymer was separated by filtering and dried under vacuum at 100° C.

Thereby there were obtained 290 grams of granular polyethylene showing an apparent density of 0.342 g/cc and an intrinsic viscosity of 2.6 dl/g, measured in tetralin at 135° C. The yield in polymer amounted to 765,000 g/g of Ti.

EXAMPLE 2

The preparation of the catalytic component (B) described in Example 1 was repeated but with the difference that there were used 54 cc of n-$C_4H_9MgCl$ and 2 g of $TiCl_4$.

The analysis of the product thus obtained showed a content in titanium of 1.40% by weight. Thereupon, 0.035 g of that component (B) was used for polymerizing ethylene under the same conditions as those of Example 1.

Thereby were obtained 300 g of granular polyethylene that had an apparent density of 0.321 and an intrinsic viscosity of 2.3 dl/g. The yield in polymer amounted to 650,000 g/g of Ti.

EXAMPLE 3

The preparation of the catalytic component (B) described in Example 1 was repeated but with the difference that there were used 3 g of magnesium powder, 23 g of n-$C_4H_9Cl$, 0.1 g of iodine, and that the reaction was carried out in 70 cc of decahydronaphthalene.

The solid reaction product of the suspension thus obtained, and from which the unreacted metal magnesium had been separated, weighed 7 grams. That solid was suspended in 50 cc of n-heptane. Subsequently, there were added to it dropwise 0.36 g of $TiCl_4$ dissoled in 5 cc of n-heptane, at 50° C and over a period of 5 minutes. Heating was carried on for about 1 hour.

The solid was then filtered, repeatedly washed with n-heptane and dried under vacuum. The dry product showed a content in titanium equal to 0.41% by weight.

0.0889 g of the catalytic component (B) thus prepared was used for polymerizing ethylene under the conditions described in Example 1. Thereby were obtained 449 g of granular polyethylene having an apparent density of 0.327 and an intrinsic viscosity of 2.4 dl/g. The yield in a polymer amounted to 1,180,000 g/g of Ti.

EXAMPLE 4

The preparation of the catalytic component (B) described in Example 1 was repeated but with the variations that there were used 10 g of magnesium powder, 38 g of n-$C_4H_9Cl$ and 0.1 g of iodine. The unreacted magnesium metal was separated from the suspension thus obtained.

The 2.32 g of the solid reaction product, suspended in 50 cc of n-heptane, were then added dropwise 0.0093 g of $TiCl_4$, dissolved in 5 cc of n-heptane, at 50° C in a time period of 5 minutes. The heating was carried on for about 2 hours. The solid reaction product, filtered repeatedly washed with n-heptane and dried under vacuum, showed a content in titanium of 0.0915% by weight.

0.0114 g of the catalyst component (B) thus prepared was used for polymerizing ethylene under the conditions described in Example 1.

Thereby were obtained 58 g of granular polymer having an apparent density of 0.346 g/cc and an inherent viscosity of 2.4 dl/g. The yield in polymer amounted to 5,600,000 g/g of Ti.

EXAMPLE 5

6.0 g of n-butyl magnesium chloride, prepared as indicated in Example 1, were co-ground in a porcelain, ball mill in a current of inert gas, with 0.44 g of TiCl$_3$ARA (3TiCl$_3$.AlCl$_3$) for 6 hours. The product thus obtained contained 0.176% by weight of titanium.

0.14 g of the catalyst component (B) thus prepared was used for the polymerization of ethylene under the conditions indicated in Example 1. Thereby were obtained 123 g of granular polyethylene having an apparent density of 0.363 and an intrinsic viscosity of 2.7 dl/g. The yield in polymer amounted to 500,000 g/g of Ti.

While the invention has been illustrated in terms of n-butyl magnesium halide as the organic magnesium halide, similar results are obtained by employing other organic magnesium halides RMgX as defined herein, other Ti compounds as disclosed, and other organometallic compounds (or hydrides) of the Groups I to III metals within the scope of the disclosure. Since such modifications in details may be made in practicing our invention without departing from its spirit, we intend to include in the scope of the appended claims all variations which will be obvious to those skilled in the art from the description and illustrative working examples given herein.

We claim:

1. A catalyst for the polymerization of olefins and the starting components of which comprise
   (A) a catalyst-forming component which is an organometallic compound of aluminum and
   (B) a catalyst-forming component which is the product obtained by mixing (1) an organic magnesium halide having the formula RMgX, in which R is selected from the group consisting of alkyl, aryl, aralkyl and alkyl-aryl radicals and X is a halogen atom, and (2) a halogenated titanium compound selected from the group consisting of halides, oxyhalides, haloalcoholates, halotitanates, said catalyst-forming component (B) containing from 0.05% to 10% by weight of titanium.

2. A catalyst for the polymerization of olefins and the starting components of which comprise a catalyst-forming component (A) as in clam 1 and a catalyst-forming component (B) as in claim 1, said catalyst-forming component (B) being further characterized in that the halogenated titanium compound is a liquid and component (B) is obtained by mixing the liquid titanium compound with the organic magnesium compound in a molar ratio of the magnesium compound to the liquid titanium compound of 25:1 to 1,000:1 or by mixing an excess of the liquid titanium compound with the organic magnesium compound and removing the excess of titanium compound.

3. A catalyst for the polymerization of olefins and the starting components of which comprise a catalyst-forming component (A) as in claim 1 and a catalyst-forming component (B) as in claim 1, said catalyst-forming component (B) being further characterized in that the halogenated titanium compound is a solid and component (B) is obtained by grinding the solid titanium compound with the organic magnesium compound in a molar ratio of the magnesium compound to the solid titanium compound of 2.5:1 to 1,000:1.

* * * * *